Patented Mar. 8, 1949

2,464,194

UNITED STATES PATENT OFFICE 2,464,194

REDUCTION OF NITROPHENOLS

Bernhard G. Zimmerman, Westfield, N. J., assignor to General Aniline & Film Corporation, New York, N. Y., a corporation of Delaware No Drawing. Application May 5, 1945, Serial No. 592,283

8 Claims. (Cl. 260—575)

This invention relates to the selective reduction of 2,4-dinitrophenols for the production of 2-amino-4-nitrophenols.

While the reduction of mono-nitro and polynitro aromatic compounds is well known in the art, when such processes have been applied to the reduction of 2,4-dinitrophenolic compounds, the action of the reducing substance employed, for instance, an alkali metal sulfide or polysulfide, has not been selective, so that there is produced a mixture of 2-amino-4-nitrophenol and the isomeric 2-nitro-4-aminophenol, as well as considerable quantities of the product in which both nitro groups have been reduced.

I have now discovered that by employing as the reducing agent, a sulfide or polysulfide of the alkali metals and ammonia, such as ammonium sulfide, sodium disulfide, potassium sulfide, etc., and carrying out the reduction in a relatively dilute aqueous solution or suspension of an alkaline earth metal alkali, such as the alkaline earth metal oxides or hydroxides or their alkaline reacting salts, such as calcium hydroxide, magnesium hydroxide, etc., and preferably in the presence of a small amount of a substantially neutral salt of an alkaline earth metal, such as calcium or magnesium chloride, a selective reduction of 2,4-dinitrophenols takes place, resulting in the production of 2-amino-4-nitrophenols in good yield and high state of purity, and with little or no formation of isomeric 4-amino-2-nitrophenols or of the completely reduced 2,4-diaminophenols.

The process of the present invention will be apparent to those skilled in the art from a consideration of the following specific examples thereof.

Example 1

The charge to the process was composed of 4300 parts of water, 300 parts of magnesium chloride, 125 parts of hydrated lime, and 218.5 parts of 6-chloro-2,4-dinitrophenol. This charge was heated to 30–35° C. and agitated at this temperature for approximately 3 hours. During this period, the 6-chloro-2,4-dinitrophenol was converted into the corresponding calcium phenolate. The charge was then cooled to 25° C. and there was added 1200 parts of a 15% solution of sodium disulfide. The reaction mixture was stirred at 25° C. for 12 hours or until the reduction was substantially complete and was then heated to 80° C. over a period of 2 hours and kept at this temperature for 4 hours in order to ensure complete reduction of the nitro group in 2-position. On completion of the reduction, the mixture was cooled and the precipitated calcium salt of 6-chloro-2-amino-4-nitrophenol was separated by filtration and washed with 25% salt solution. The filter cake was then mixed with 2000 parts of water to which was added 600 parts of 78% $H_2SO_4$ in order to convert the calcium phenolate into the corresponding phenol, the mixture being heated to 65° C. in order to speed up the reaction. 30 parts of activated charcoal were added and the mixture agitated at 65° C. over night. It was then cooled to room temperature, filtered and washed with water. The filtrate and washings were mixed and neutralized with alkali so as to precipitate the 6-chloro-4-nitro-2-amino phenol which was then filtered off and dried.

Example 2

In this case, the charge to the process was 3300 parts of water, 300 parts of calcium chloride, 125 parts of hydrated lime, and 184 parts of 2,4-dinitrophenol. This charge was heated to 40° C. and agitated at this temperature for 3 hours in order to form the corresponding calcium 2,4-dinitrophenolate. At the end of 3 hours, the mixture was cooled to 25° C. and 1200 parts of a 15% aqueous solution of sodium disulfide was added. The reaction mixture was agitated at 25° C. for 12 hours, during which time the nitro group in 2-position was reduced mostly to the amino group. In order to ensure complete reduction, the mixture was then heated to 80° C., during the course of 2 hours, and maintained at this temperature for 4 hours. It was then cooled to room temperature and the precipitated calcium 2-amino-4-nitrophenolate separated by filtration and washed with a 25% salt solution. The filter cake was then charged to 2000 parts of water, to which had been added 600 parts of 78% $H_2SO_4$ and the mixture heated to 65° C. to break down the calcium phenolate into the corresponding phenol. 20 parts of activated charcoal were then added and the mixture agitated at 65° C. overnight. It was then cooled to room temperature, filtered and washed with cold water. The filtrate, together with the washings, was collected and neutralized with alkali to precipitate the 4-nitro-2-aminophenol which was filtered off.

It should be understood that the foregoing examples are illustrative only of the present invention and that various modifications may be made therein by those skilled in the art. I have found that in practicing the present invention, it is desirable to use relatively dilute solutions of alkaline earth metal compounds since if the solution is too strongly alkaline, the process is not so selective and there is a tendency for both nitro groups to be reduced, resulting in the formation of 2,4-diaminophenols and a mixture of the isomers 2-amino-4-nitrophenol and 2-nitro-4-aminophenol. It should also be noted that in case the 2,4-dinitrophenol being reduced bears a substituent such as chlorine or some other halogen which is apt to be replaced by a hydroxyl group in the presence of an alkali, a somewhat more dilute solution should be employed than is otherwise the case. Thus, in Example 1, the alkaline earth metal solution employed was more dilute than that employed in Example 2, due to the presence of the chlorine in 6-position in the phenol being reduced in Example 1.

The temperature employed on mixing the dinitrophenol with the alkaline solution in order to convert the phenol to the alkaline earth metal phenolate may be varied considerably. A sufficiently elevated temperature is preferably employed so as to assure a satisfactory rate of reaction. On the other hand, too high a temperature should not be employed since it is necessary, in a subsequent step of the process, to cool the solution somewhat. In general, a temperature of from 30° C. to 50° C. is satisfactory. As stated, the temperature of the solution should be lowered to approximately room temperature before adding the reducing agent, alkali metal sulfide or polysulfide, to the dilute solution of the alkaline earth metal phenolate in order that the selective reduction of the nitro group in 2-position will be effected to the exclusion of reduction of the nitro group in 4-position. At room temperature, i. e., 20–25° C., and when operating in a relatively dilute alkaline solution, the reaction is highly selective and there is no noticeable reduction of the nitro groups in 4-position. Slightly higher temperatures with consequent higher rates of reaction may be employed when such high selectivity is not essential. As indicated in the specific examples, after the reduction is substantially complete, further heating may be employed to ensure complete reduction without noticeable adverse effect on the selectivity of the reduction.

It will be understood that the particular reagents specified in the specific examples are illustrative only of preferred embodiments of the invention. The use of calcium chloride and hydrated lime is economically most attractive. However, from a purely scientific viewpoint, the other alkaline earth metal salts and hydroxide or oxides may be substituted for them. Likewise, sodium disulfide has been specified in the specific examples, since it is most attractive as a reducing agent from an economic standpoint, being readily prepared from caustic soda and sulfur by known methods, but other alkali metal sulfides and polysulfides are the equivalent thereof and may be substituted therefor.

The present invention is broadly applicable to the selective reduction of 2,4-dinitrophenols of the following formula:

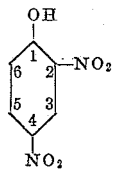

which, in the 3-, 5- or 6-position, may be substituted with other simple substituents, such as halogens, or lower alkyl groups.

I claim:

1. The method of selectively reducing the nitro group in 2 position of 2,4-dinitro phenols of the formula:

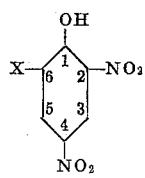

wherein X represents a member of the group consisting of hydrogen and halogen which comprises reacting said phenol with a dilute aqueous suspension of an alkaline reacting alkaline earth metal compound to form the corresponding phenolate, and treating the thus formed solution of phenolate with an alkali metal sulfide at approximately 20–25° C. for about 12 hours and thereafter raising the temperature to about 80° C. to thereby reduce the nitro group in 2 position only.

2. The method of selectively reducing the nitro group in 2 position of 2,4-dinitro phenols of the formula:

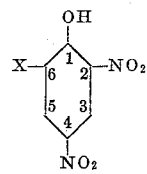

wherein X represents a member of the group consisting of hydrogen and halogen which comprises reacting said phenol with a dilute aqueous solution of a water soluble neutral alkaline earth metal salt containing, in suspension, an alkaline reacting alkaline earth metal compound to form the corresponding phenolate, and treating the thus formed solution of phenolate with an alkali metal sulfide at approximately 20–25° C. for about 12 hours and thereafter raising the temperature to about 80° C. to thereby reduce the nitro group in 2 position only.

3. The method of selectively reducing the nitro group in 2 position of 2,4-dinitro phenols of the formula:

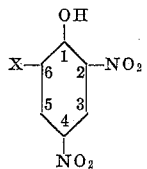

wherein X represents a member of the group consisting of hydrogen and halogen which comprises reacting said phenol with a dilute aqueous suspension of hydrated lime to form the corresponding calcium phenolate and treating the thus formed solution of phenolate with an alkali metal sulfide at approximately 20–25° C. for about 12 hours and thereafter raising the temperature to about 80° C. to thereby reduce the nitro group in 2 position only.

4. The method of selectively reducing the nitro group in 2 position of 2,4-dinitro phenols of the formula:

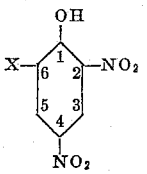

wherein X represents a member of the group consisting of hydrogen and halogen which comprises reacting said phenol with a dilute aqueous solution of calcium chloride containing hydrated lime in suspension to form the corresponding phenolate and treating the thus formed solution of phenolate with sodium disulfide at approximately 20–25° C. for about 12 hours and thereafter raising the temperature to about 80° C. to thereby reduce the nitro group in 2 position only.

5. The method of producing 4-nitro-2-amino phenol, which comprises mixing 2,4-dinitro phenol with a dilute aqueous suspension of hydrated lime to form the corresponding phenolate and treating the thus formed solution of the phenolate with sodium disulfide at approximately 20–25° C. for about 12 hours and thereafter raising the temperature to about 80° C. to thereby reduce the nitro group in 2 position only.

6. The method of producing 2-amino-4-nitro phenol, which comprises mixing 2,4-dinitro phenol with a dilute aqueous solution of calcium chloride containing, in suspension, hydrated lime to thereby form the corresponding phenolate and treating the thus formed solution of phenolate with sodium disulfide at approximately 20–25° C. for about 12 hours and thereafter raising the temperature to about 80° C. to thereby reduce the nitro group in 2 position only.

7. The method of producing 6-chloro-4-nitro-2-amino phenol, which comprises mixing 6-chloro-2,4-dinitro phenol with a dilute aqueous suspension of hydrated lime to form the corresponding phenolate and treating the thus formed solution of the phenolate with sodium disulfide at approximately 20–25° C. for about 12 hours and thereafter raising the temperature to about 80° C. to thereby reduce the nitro group in 2 position only.

8. The method of producing 6-chloro-4-nitro-2-amino phenol, which comprises mixing 6-chloro-2,4-dinitro phenol with a dilute aqueous solution of calcium chloride containing, in suspension, hydrated lime to thereby form the corresponding phenolate and treating the thus formed solution of phenolate with sodium disulfide at approximately 20–25° C. for about 12 hours and thereafter raising the temperature to about 80° C. to thereby reduce the nitro group in 2 position only.

BERNHARD G. ZIMMERMAN.

REFERENCES CITED

The following references are of record in the file of this patent:

UNITED STATES PATENTS

| Number | Name | Date |
|---|---|---|
| 1,074,545 | Flurscheim | Sept. 30, 1913 |
| 1,689,014 | Dieterle | Oct. 23, 1928 |
| 1,878,950 | Lyford | Sept. 20, 1932 |
| 2,381,877 | Carpenter | Aug. 14, 1945 |